(12) United States Patent
Kim et al.

(10) Patent No.: US 9,190,045 B2
(45) Date of Patent: Nov. 17, 2015

(54) NOISE-ABSORBENT FABRIC FOR VEHICLE AND METHOD FOR MANUFACTURING THE SAME

(71) Applicants: Hyundai Motor Company, Seoul (KR); Kia Motors Corporation, Seoul (KR)

(72) Inventors: Keun Yong Kim, Gyeonggi-do (KR); Won Jin Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/628,747

(22) Filed: Sep. 27, 2012

(65) Prior Publication Data

US 2013/0341121 A1      Dec. 26, 2013

(30) Foreign Application Priority Data

Jun. 20, 2012  (KR) .................. 10-2012-0066309

(51) Int. Cl.
| | |
|---|---|
| *E04B 1/84* | (2006.01) |
| *E04B 1/82* | (2006.01) |
| *G10K 11/00* | (2006.01) |
| *G10K 11/162* | (2006.01) |
| *B32B 38/00* | (2006.01) |
| *B60R 13/08* | (2006.01) |

(Continued)

(52) U.S. Cl.
CPC ............... *G10K 11/162* (2013.01); *B32B 5/26* (2013.01); *B32B 5/28* (2013.01); *B32B 7/02* (2013.01); *B32B 38/00* (2013.01); *B60R 13/08* (2013.01); *B60R 13/0815* (2013.01); *C09D 163/00* (2013.01); *D04H 1/4242* (2013.01);

*D04H 1/4326* (2013.01); *D04H 1/46* (2013.01); *D04H 1/587* (2013.01); *D06M 15/55* (2013.01); *E04B 1/84* (2013.01)

(58) Field of Classification Search
CPC .. G10K 11/162; B60R 13/08; B60R 13/0815; B32B 5/26; B32B 5/28; B32B 7/02; B32B 38/00
USPC ........... 181/294, 210, 286; 156/148; 442/120, 442/356, 374, 402
See application file for complete search history.

(56) References Cited

U.S. PATENT DOCUMENTS

| | | | | |
|---|---|---|---|---|
| 3,451,109 A | * | 6/1969 | Klein ..................... | D04H 11/08 156/148 |
| 4,476,186 A | * | 10/1984 | Kato ....................... | D04H 1/42 156/148 |

(Continued)

FOREIGN PATENT DOCUMENTS

| | | |
|---|---|---|
| JP | 2005-335279 A | 12/2005 |
| JP | 2006138935 A | 6/2006 |

(Continued)

*Primary Examiner* — Elvin G Enad
*Assistant Examiner* — Christina Schreiber
(74) *Attorney, Agent, or Firm* — Mintz Levin Cohn Ferris Glovsky and Popeo, P.C.; Peter F. Corless

(57) ABSTRACT

Disclosed is a noise-absorbent fabric for a vehicle and a method for manufacturing the same. The noise-absorbent fabric for the vehicle includes a mono-layered nonwoven fabric and a binder. The mono-layered nonwoven fabric is formed of a super fiber, such as an aramid fiber, with a fineness of about 1 denier to about 15 deniers and a thickness of about 3 mm to about 20 mm. The binder is located in the same layer as the nonwoven fabric to maintain a three-dimensional shape of the nonwoven fabric.

25 Claims, 3 Drawing Sheets

(51) Int. Cl.
*B32B 7/02* (2006.01)
*B32B 5/26* (2006.01)
*B32B 5/28* (2006.01)
*D04H 1/4242* (2012.01)
*D04H 1/4326* (2012.01)
*D04H 1/46* (2012.01)
*D04H 1/587* (2012.01)
*C09D 163/00* (2006.01)
*D06M 15/55* (2006.01)

(56) References Cited

U.S. PATENT DOCUMENTS

| | | | | |
|---|---|---|---|---|
| 4,696,764 | A * | 9/1987 | Yamazaki | C09D 5/24 106/1.12 |
| 5,298,694 | A * | 3/1994 | Thompson | B32B 5/02 181/286 |
| 5,536,556 | A * | 7/1996 | Juriga | B29C 43/203 181/284 |
| 5,591,289 | A * | 1/1997 | Souders | B29C 70/088 156/148 |
| 6,322,658 | B1 * | 11/2001 | Byma | B32B 7/02 156/272.2 |
| 6,329,465 | B1 * | 12/2001 | Takahashi | C08L 23/0815 525/191 |
| 7,878,301 | B2 * | 2/2011 | Gross | B32B 5/22 181/286 |
| 7,918,313 | B2 * | 4/2011 | Gross | D04H 13/006 181/284 |
| 8,652,288 | B2 * | 2/2014 | Blinkhorn | B32B 5/26 156/308.2 |
| 2001/0036788 | A1 * | 11/2001 | Sandoe | B32B 5/26 442/389 |
| 2002/0006755 | A1 * | 1/2002 | North | B29C 70/506 442/50 |
| 2002/0100635 | A1 * | 8/2002 | Inoue | G10K 13/00 181/167 |
| 2003/0134553 | A1 * | 7/2003 | Sheffer | B32B 3/26 442/120 |
| 2004/0077247 | A1 * | 4/2004 | Schmidt | B32B 5/26 442/382 |
| 2005/0115662 | A1 * | 6/2005 | Haque | B29C 70/086 156/148 |
| 2006/0099870 | A1 * | 5/2006 | Garcia | D04H 13/008 442/374 |
| 2006/0137799 | A1 * | 6/2006 | Haque | B32B 5/06 156/62.2 |
| 2008/0121461 | A1 * | 5/2008 | Gross | B32B 27/12 181/286 |
| 2008/0251187 | A1 * | 10/2008 | Haque | D04H 1/42 156/148 |
| 2011/0186381 | A1 * | 8/2011 | Ogawa | B32B 5/26 181/294 |
| 2013/0341121 | A1 * | 12/2013 | Kim | D04H 1/4242 181/294 |
| 2014/0124119 | A1 * | 5/2014 | Kim | B32B 38/0012 156/62.8 |
| 2015/0233112 | A1 * | 8/2015 | Kim | E04B 1/84 181/294 |
| 2015/0259904 | A1 * | 9/2015 | Kim | E04B 1/84 181/294 |

FOREIGN PATENT DOCUMENTS

| | | |
|---|---|---|
| JP | 2007039826 A | 2/2007 |
| JP | 2010-059964 A | 3/2010 |
| KR | 10-2006-0111330 A | 10/2006 |
| KR | 10-1114805 | 3/2007 |
| WO | 2005-019783 A1 | 3/2005 |

* cited by examiner

NOISE-ABSORBENT FABRIC FOR VEHICLE AND METHOD FOR MANUFACTURING THE SAME

CROSS-REFERENCE TO RELATED APPLICATION

This application claims under 35 U.S.C. §119(a) the benefit of Korean Patent Application No. 10-2012-0066309 filed Jun. 20, 2012, the entire contents of which are incorporated herein by reference.

BACKGROUND (a) Technical Field

The present invention relates to a noise-absorbent fabric for a vehicle and a method for manufacturing the noise-absorbent fabric. More particularly, the present invention relates to a noise-absorbent fabric for a vehicle and a method for manufacturing the noise-absorbent fabric, which is applicable for high temperature applications of about 200° C. or more, such as engines and exhaust systems of vehicles.

(b) Background Art

Generally, various kinds of sound-absorbing and blocking materials are installed on various components of a vehicle body to block and absorb noise. For example, materials having sounds absorbing and/or blocking properties can be used to block and/or absorb generated in an engine room or a power transmission system of a vehicle to prevent the noise from leaking into the interior passenger compartment of a vehicle. The design of these sound-absorbing and blocking materials is a very important factor in the design of the vehicle.

The most important factor in the design of the sound-absorbing and blocking materials for vehicles is the installation of suitable sound-absorbing and blocking materials with sufficient sound-absorbing and blocking characteristics at suitable locations.

Currently, polyethylene terephthalate (PET), polyurethane, glass wool, and resin felt are being widely used as sound-absorbing and blocking materials.

However, the above materials are only suitable for use at temperatures of about 200° C. or less. In particular, the durability of these materials is rapidly reduced at high temperature conditions of about 200° C. or more, which prohibits their application to parts located near noise sources such as an engine and an exhaust system. The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a noise-absorbent fabric for a vehicle and a method for manufacturing the noise-absorbent fabric. The noise-absorbent fabric of the present invention can be applied to parts adjacent to noise sources such as engines and exhaust systems, and provide reliable sound-absorbing performance by maintaining durability at high temperature conditions. In particular, noise-absorbent fabrics according to the present invention utilize a super fiber with sufficient thermal resistance, rather than typical materials such as polyethylene terephthalate (PET).

In one aspect, the present invention provides a noise-absorbent fabric for a vehicle, including: a mono-layered nonwoven fabric formed of a super fiber, and a binder located in the same layer as the nonwoven fabric to maintain a three-dimensional shape of the nonwoven fabric. The super fiber can be selected from any known super fibers, such as aramid, polybeszoxazole (PBO), polybenzimidazole (PBI), polyimide (PI), and carbon fiber. According to various embodiments, the super fiber is a fiber with a fineness of about 1 denier to about 15 deniers and a thickness of about 3 mm to about 20 mm. In an exemplary embodiment, the super fiber is an aramid fiber with a fineness of about 1 denier to about 15 deniers and a thickness of about 3 mm to about 20 mm.

In an exemplary embodiment, the nonwoven fabric has an areal density of about 200 $g/m^2$ to about 1,200 $g/m^2$.

In another aspect, the present invention provides a method for manufacturing a noise-absorbent fabric for a vehicle, including: forming a nonwoven fabric using a super fiber; impregnating the nonwoven fabric in a thermosetting resin solution; drying the impregnated nonwoven fabric; and curing the dried nonwoven fabric at a high temperature to be used as vehicle components. The nonwoven fabric may be formed from any known super fibers, such as aramid, polybeszoxazole (PBO), polybenzimidazole (PBI), polyimide (PI), and carbon fiber. In various embodiments, the super fiber has a fineness of about 1 denier to about 15 deniers and a thickness of about 3 mm to about 20 mm. According to an exemplary embodiment, the super fiber is an aramid nonwoven fabric with a fineness of about 1 denier to about 15 deniers and a thickness of about 3 mm to about 20 mm. The nonwoven fabric may be formed by any suitable known method for forming nonwoven fabrics, and, for example, may be formed by a needle punching process.

In an exemplary embodiment, the nonwoven fabric is formed by continuously performing up-down needling, down-up needling, and up-down needling.

In another exemplary embodiment, the nonwoven fabric is formed in a needle punching process by needle strokes of about 30 $time/cm^2$ to about 350 $time/cm^2$.

In still another exemplary embodiment, the thermosetting resin solution includes a combination of an epoxy resin, a curing agent, a catalyst, a flame retardant and may further include residual solvent. in particular, the thermosetting resin solution can include an epoxy resin of about 10 wt % to about 60 wt %, a curing agent of about 2 wt % to about 10 wt %, a catalyst of about 1 wt % to about 5 wt %, a flame retardant of about 10 wt % to about 40 wt %, and a residual solvent.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
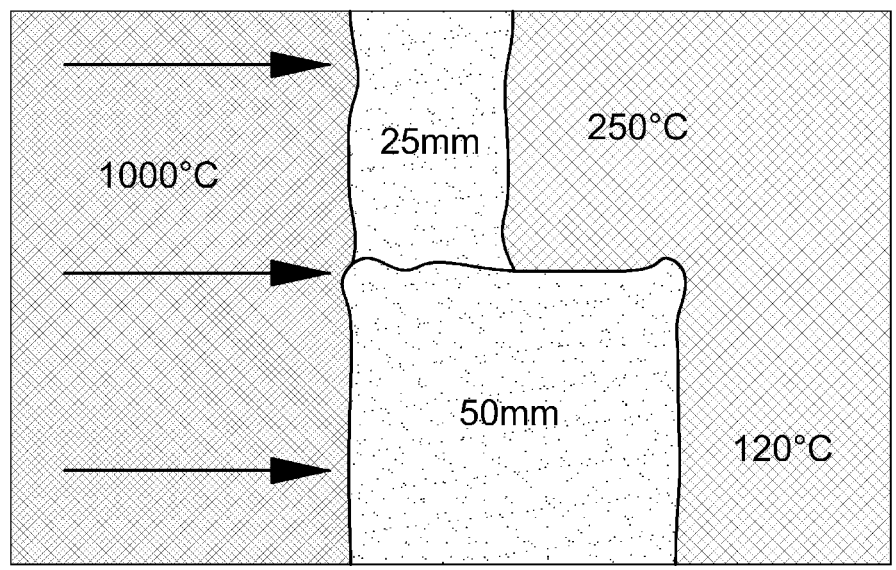
FIG. 1 is a view illustrating a heat-blocking function of a noise-absorbent fabric for a vehicle according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The above and other features of the invention are discussed infra.

Hereinafter, exemplary embodiment of the present invention will be described in detail with reference to the accompanying drawings.

Figure 2:
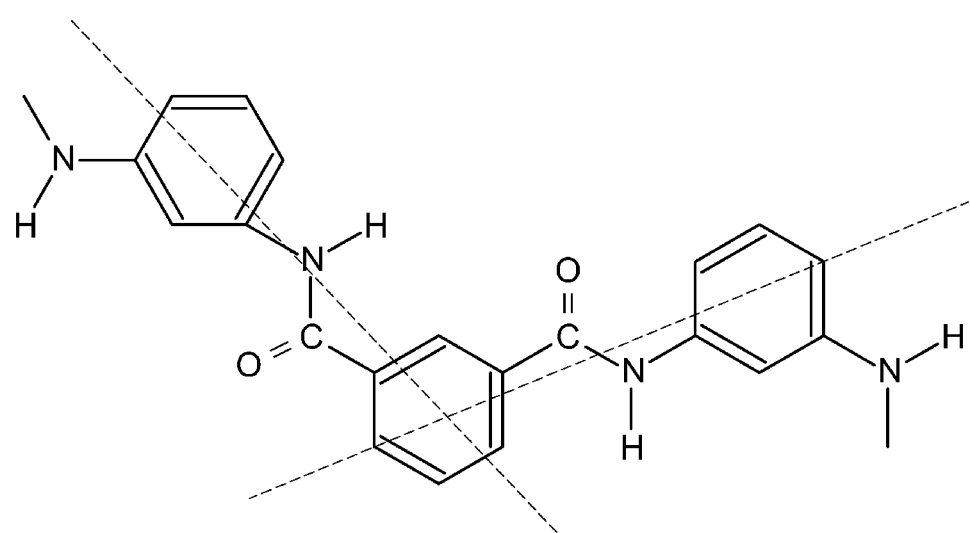
FIG. 2 is a view of the structural formula of a meta-aramid fiber.
Figure 3:
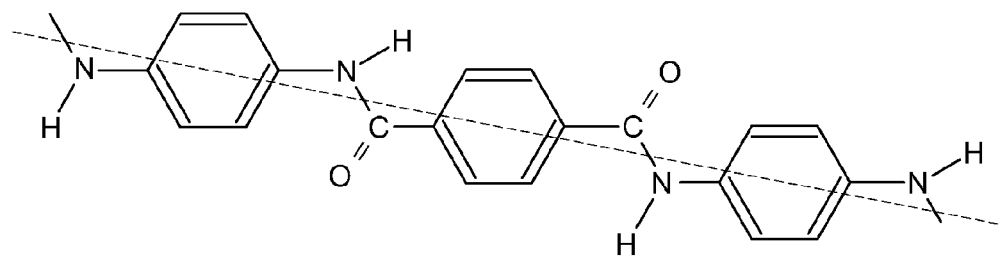
FIG. 3 is a view of a structure formula of a para-aramid fiber.

FIG. 1 is a view illustrating a heat-blocking function of a noise-absorbent fabric for a vehicle according to an embodiment of the present invention. FIG. 2 is a view of the structural formula of a meta-aramid fiber. FIG. 3 is a view of a structural formula of a para-aramid fiber The present invention relates to a noise-absorbent fabric for a vehicle and a method for manufacturing the noise-absorbent fabric, which can ensure sound-absorbing performance even at high temperatures of about 200° C. or more.

The noise-absorbent fabric for the vehicle may be applied in areas subjected to high temperatures of about 200° C. or more. In particular, by using a super fiber in a noise-absorbent fabric, vibration and noise from parts, such as an engine and an exhaust system of a vehicle, can be absorbed and blocked.

The noise-absorbent fabric manufactured using the super fiber may also have a heat-blocking function. As shown in FIG. 1, when heat at an elevated temperature is applied to one side of the noise-absorbent fabric, heat may be blocked by the noise-absorbent fabric, resulting in reduced heat at an opposite side. As demonstrated, application of heat at about 1000° C. at one side of a 25 mm noise-absorbent fabric of the invention results in reduction of temperature to about 250° C. at the opposite side, while application of heat at about 1000° C. at one side of a 50 mm noise-absorbent fabric of the invention results in reduction of temperature to about 120° C. at the opposite side. Thus, in general, as the thickness of the noise-absorbent fabric increases, the heat-blocking performance further increases.

The term "super fiber", as used herein, generally refers to any material that has excellent mechanical strength, thermal resistance, and fire resistance as compared to typical material (e.g., polyethylene terephthalate (PET)). Examples of super fiber may include, but are not limited to, aramid, polybeszoxazole (PBO), polybenzimidazole (FBI), polyimide (PI), and carbon fiber.

In particular, aramid is an aromatic polyamide fiber in which amide linkages (—CONH—) are attached to aromatic rings such as benzene rings to form a polymer polyamide, and are thus distinct from aliphatic polyamide (nylon).

According to various embodiments, the aramid fiber may be manufactured by aromatic polyamide spinning, and may be divided into meta-aramid and para-aramid. The aramid fiber can also include commercially available products, such as Nomex® and Kevlar®, respectively.

In particular, with respect to meta-aramid fiber, Nomex® is a brand of meta-aramid fiber that was developed by Dupont Inc. in 1967. Meta-aramid is also commercially available as Conex® from Teijin. These meta-aramids are typically provided for products such as filament, staple, yarn, and paper. Meta-aramid, as also commonly referred to as m-aramid and may be referred to as such herein.

M-aramid is also widely used for insulating products (insulating paper and tape), heat-resistant fibers (fire fighting garment and fire-resistant gloves), and high temperature filters.

M-aramid may be manufactured by melting isophthaloyl chloride (IPC) and m-phenylene diamine (MPD) in DMAc for reaction. In the case of Nomex®, and other m-aramids, dry spinning can be carried out after reaction. The structural formula of m-aramid is shown in FIG. 1.

M-aramid may have a relatively high fracture elongation of about 22% to about 40% due to its bent polymer structure. As such, m-aramid are better suited for dying which may be advantageous for fiberization.

With respect to para-aramid fibers, Kevlar® is a brand of p-aramid developed by Dupont Inc. in the early 1970s. P-Aramid is commercially available under the names Kevlar® (Dupont), Twaron® (Teijin), and Technora® (co-polymer, Teijin). P-aramid is typically provided for products such as filament, staple, and yarn.

P-aramid has strength and elongation about three to seven times higher than those of m-Aramid. Thus, p-aramid may be suitably used as reinforcing materials or protection materials.

P-aramid may be manufactured by melting terephthaloyl chloride (TPC) and p-phenylene diamine (PPd) in NMP, followed by wet spinning. The structural formula of p-aramid is shown in FIG. 2.

P-aramid demonstrates high strength characteristics due to its linear highly-oriented molecular structure. Further, since p-aramid generally has a low fracture elongation and a rigid structure, its elongation and electricity conductivity may be low. P-aramid is also generally high in thermal resistance, structural stability, and tear strength, and may be low in thermal contraction. P-aramid also demonstrates flame resistance (not burnt or changed by flame) and self-extinguishability (flame extinguished and burning stopped when fire is removed).

As described above, since aramid fibers have advantages such as high thermal resistance and fire resistance compared to PET and nylon, aramid fibers may be used for heat-protective equipment such as special garments, industrial nonwoven fabrics, insulating materials, and strength reinforced transformers or motors.

According to embodiments of the present invention, a noise-absorbent fabric for a vehicle may include a mono-layered nonwoven fabric formed of an aramid fiber. In this way, the beneficial properties demonstrated by aramid fibers can be imparted on the noise-absorbing fabric.

Hereinafter, a method for manufacturing the noise-absorbent fabric for the vehicle according to an embodiment of the present invention will be described in detail.

A nonwoven fabric layer may be formed by any conventional method for forming nonwoven fibers, and preferably is formed by performing needle punching using aramid filament.

According to certain embodiments, only meta-aramid is used in manufacturing the nonwover fabric. According to other embodiments, only para-aramid is used in manufacturing the nonwover fabric. According to yet other embodiments, a combination of both of meta-aramid and para-aramid are used to manufacture the nonwoven fabric.

The fineness of the aramid filament used as a yarn for the nonwoven fabric may vary, and will typically range from about 1 denier to about 15 denier.

In this case, when the fineness is smaller than about 1 or greater than about 15 denier, various properties that are required in the nonwoven fabric may not be satisfied and/or necessary binding strength may not be satisfied. Accordingly, the fineness of the yarn for the nonwoven fabric should range from about 1 denier to about 15 denier.

The thickness of the nonwoven fabric pile layer may vary, and will typically range from about 3 mm to about 20 mm. When the thickness of the nonwoven fabric pile layer is smaller than about 2 mm, it may be difficult to provide appropriate durability and moldability properties suitable for interior and exterior materials of vehicles. On the other hand, when the thickness of the nonwoven fabric pile layer is greater than about 20 mm, the productivity of fabric may be reduced, and the manufacturing cost may increase.

While the weight of the nonwoven fabric may vary, it will generally range from about 200 $g/m^2$ to about 1,200 $g/m^2$ in consideration of performance and cost.

According to the present invention, the aramid nonwoven fabric may form a physical bridge that provides the necessary thickness, binding strength, and other desired properties. The nonwoven fabric can be formed through continuous processes, including primary up-down preneedling, secondary down-up needling, and tertiary up-down needling, and by stacking a web of about 30 $g/m^2$ to about 100 $g/m^2$ formed by carding two- to twelve-fold.

In this case, the needle used to perform the needling may include a barb type of needle. According to an exemplary embodiment, a barb needle that is about 0.5 mm to about 3 mm in working blade, and about 70 mm to about 120 mm in needle length (distance from crank outside to point, wherein the "crank" refers to the 90° bend on the top of the needle).

According to various embodiments, the needle stroke may range from about 30 time/$m^2$ to about 350 time/$m^2$.

More preferably, the fineness of yarn for the nonwoven fabric ranges from about 1.5 to about 8 denier, the thickness of the pile layer ranges from 6 mm to about 13 mm, and the needle stroke ranges from about 120 time/$cm^2$ to about 250 time/$cm^2$. According to preferred embodiments, the weight of the formed nonwoven fabric ranges from about 300 $g/cm^2$ to about 800 $g/cm^2$.

After the nonwover fabric has been provided, the noise-absorbent fabric for the vehicle may be formed into desired component shapes for use as vehicle components.

According to various embodiments, the noise-absorbent fabric is formed into a desired shape by impregnating the nonwoven fabric in a binder which is formed of a thermosetting resin material, thereby to performing binder treatment for subsequent thermoforming.

In particular, the binder treatment is performed so as to implement a three-dimensional shape, rather than the typical purpose of binders which is to provide adhesion and junction.

In other words, the nonwoven fabric manufactured with aramid yarn may be impregnated in a liquid thermosetting resin, and may then be dried and cured at a high temperature to maintain the three-dimensional shape of the nonwoven fabric which is cured at a high temperature using the thermosetting resin.

For the binder treatment, typical formulations can be used such as, for example, curing agent, catalyst, solvent, flame retardant, and a thermosetting resin with excellent thermal resistance. According to preferred embodiments, the thermosetting resin includes epoxy resin.

According to various embodiments, the epoxy resin may be selected from bisphenol A diglycidyl ether, bisphenol F diglycidyl ether, polyoxyproplyene diglycidyl ether, and bisphenol A diglycidyl ether polymer, and combinations thereof.

According to various embodiments, the curing agent may be selected from diciandiamide, urea, and imidazole, or a combination thereof.

According to various embodiments, the catalyst may be selected from bis(dimethylurea) compound and tetraphenylborate salt of quartermarized DBU, and combinations thereof.

According to various embodiments, the solvent may be selected from methyl ethyl keton (MEK), dimethyl carbonate (DMC), dimethylformamide (DMF), and acetone, and combinations thereof.

According to various embodiments, the flame retardant may be selected from melaminecyanurate, melaminpolyphosphate, ammoniumpolyphosphate, organic phosphate, and combinations thereof.

According to various embodiments, the composition and content of flame retardant thermosetting resin solution for impregnating the nonwoven fabric may be as follows.

1. Epoxy Resin: about 10 to about 60 wt % based on total weight of the thermosetting resin solution The epoxy resin may be added to implement the shape of a target nonwoven fabric. When the content of the epoxy resin is smaller than about 10 wt % or greater than about 60 wt % of the total weight of the thermosetting resin solution, the moldability and the shape persistence (i.e. ability to hold a give shape) may be reduced. Accordingly, it is desirable to add the epoxy resin in an amount of about 10 wt % to about 60 wt % of the total weight of the thermosetting resin solution.

2. Curing Agent: about 2 wt % to about 10 wt % based on the total weight of the thermosetting resin solution A curing agent may be added to implement the mechanical strength and the chemical resistance through a reaction with the target epoxy resin. When the content of the curing agent is smaller than about 2 wt % of the total weight of the thermosetting resin solution, the mechanical strength may be reduced. On the other than, when the content of the curing agent is greater than about 10 wt % of the total weight of the thermosetting resin solution, the storage stability may be reduced. Accordingly, it is desirable to add the curing agent by about 2 wt % to about 10 wt % of the total weight of the thermosetting resin solution.

3. Catalyst: about 1 wt % to about 5 wt % based on the total weight of the thermosetting resin solution A catalyst may be added to improve the fabrication condition by promoting cross-linking of the curing agent. When the content of the catalyst is smaller than about 1 wt % of the total weight of the thermosetting resin solution, the degree of the promotion may be slight, causing the limitation of reactivity. When the content of the catalyst is greater than about 5 wt % of the total weight of the thermosetting resin solution, the storage stability may be reduced. Accordingly, it is desirable to add the catalyst by about 1 wt % to about 5 wt % of the total weight of the thermosetting resin solution.

4. Flame Retardant: about 10 wt % to about 40 wt % based on the total weight of the thermosetting resin solution Flame retardant may be added to provide flame resistance. When the content of the flame retardant is smaller than about 10 wt % of the total weight of the thermosetting resin solution, the flame retardant characteristics may be slight.

When the content of the flame retardant is greater than about 40 wt % of the total weight of the thermosetting resin solution, the moldability may be reduced. Accordingly, it is desirable to add the flame retardant by about 10 wt % to about 40 wt % of the total weight of the thermosetting resin solution.

An aramid nonwoven fabric may be impregnated in the thermosetting resin solution manufactured as above, and then dried at a high temperature for a certain period and cured at a high temperature.

Accordingly, a nonwoven fabric is formed of aramid fiber with excellent thermal resistance. Hot components, such as engine and exhaust system, can then be covered by the aramid nonwoven fabric to absorb vibration and noise of the engine and the exhaust system and secure the sound-absorbing performance even when exposed to high temperature conditions.

Also, the aramid nonwoven fabric can be impregnated in thermosetting resin for a binder treatment to implement a three-dimensional shape of the nonwoven fabric. Thus, the nonwoven fabric can be used for various components of a vehicle with any desired shape.

Hereinafter, an example of the present invention will be described in detail, but the present invention is not limited to this example.

Example

The following example illustrates the invention and is not intended to limit the same.

A needle punching process was performed using a meta-aramid filament with a fineness of about 2 denier and a length of about 51 mm to manufacture an aramid nonwoven fabric with a density of about 300 g/m$^2$.

The nonwoven fabric manufactured was impregnated in a flame retardant thermosetting resin solution with 1 dip 1 nip (pick-up 300%).

In this case, the thermosetting resin solution included bisphenol A diglycidyl ether of about 8 wt %, bisphenol A diglycidyl ether polymer of about 2 wt %, diciandiamide of about 0.2 wt %, bis(dimethylurea) compound of about 0.02 wt %, melaminecyanurate of about 10%, and DMC of about 79.78 wt %, wherein all wt % are based on the total weight of the thermosetting resin solution.

Thereafter, the impregnated nonwoven fabric was be taken out and dried at a temperature of about 150° C. for about five minutes.

Next, curing was performed at a temperature of about 200° C. for about two minutes.

When a noise-absorbent fabric manufactured by the above method is applied to a part adjacent to a noise source at a heat-resistant condition of about 200° C. to about 260° C., the sound-absorbing performance can be maximized. Also, the noise-absorbent fabric may be applied to high-temperature metallic components of an exhaust system to protect surrounding plastic and rubber components with its heat-blocking function.

Thermal Resistance Evaluation

The noise-absorbent fabric according to the embodiment of the present invention was aged at a temperature of about 260° C. for about 300 hours in a thermal resistant oven to inspect the exterior and obtain the tensile strength for evaluation of the thermal resistance.

In this case, it was checked and determined whether or not there was contraction or deformation, surface peeling, fluffing, and cleaving on the exterior.

A tension test was performed using dumbbell-type No. 1, five test samples at a tension speed of about 200 mm/min under a standard condition.

The test was performed at a standard condition of a temperature of 23±2° C. and a relative humidity of 50±5%. The test samples were tested after they were maintained at the standard condition over about one hour.

Sound-absorbing Performance Evaluation

A reverberant sound absorption coefficient was measured using AlphaCabin.

Heat-blocking Performance Evaluation

Heat was applied to a heat-blocking plate until the temperature of the heat source direction reached about 250° C., while the temperature was measured at the opposite side (i.e., side opposite the side to which heat was applied, "back side").

As a result of the performance evaluation described above, the durability and the nonflammability were satisfied at a high temperature of about 260° C. for about 300 hours.

After the evaluation of the thermal resistance, there was no abnormality on the exterior, and the tensile strength also conformed to industry standards.

Figure 4:
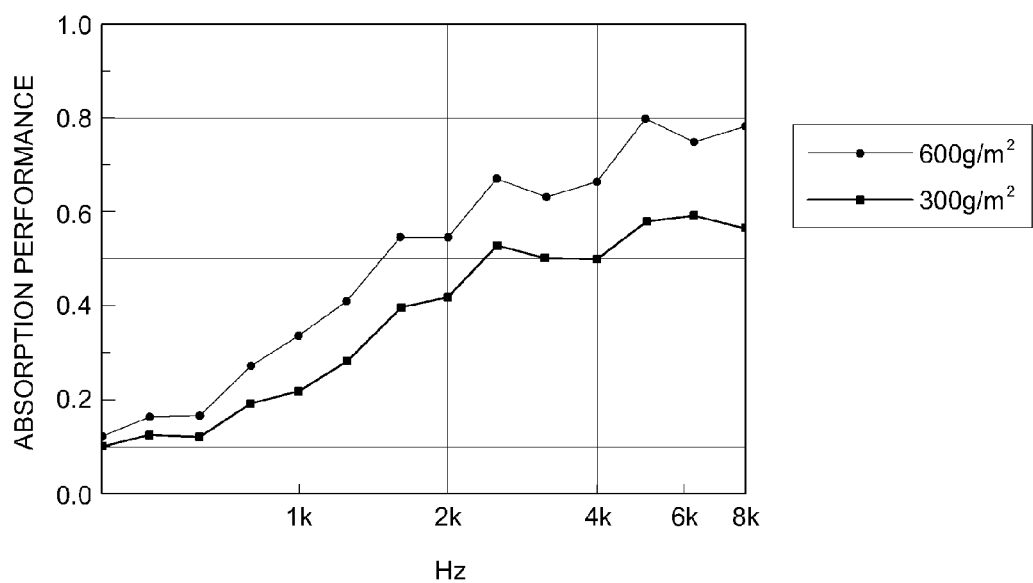
FIG. 4 is a graph illustrating an evaluation result of sound-absorbing performance of a noise-absorbent fabric for a vehicle according to an embodiment of the present invention.
Figure 5:
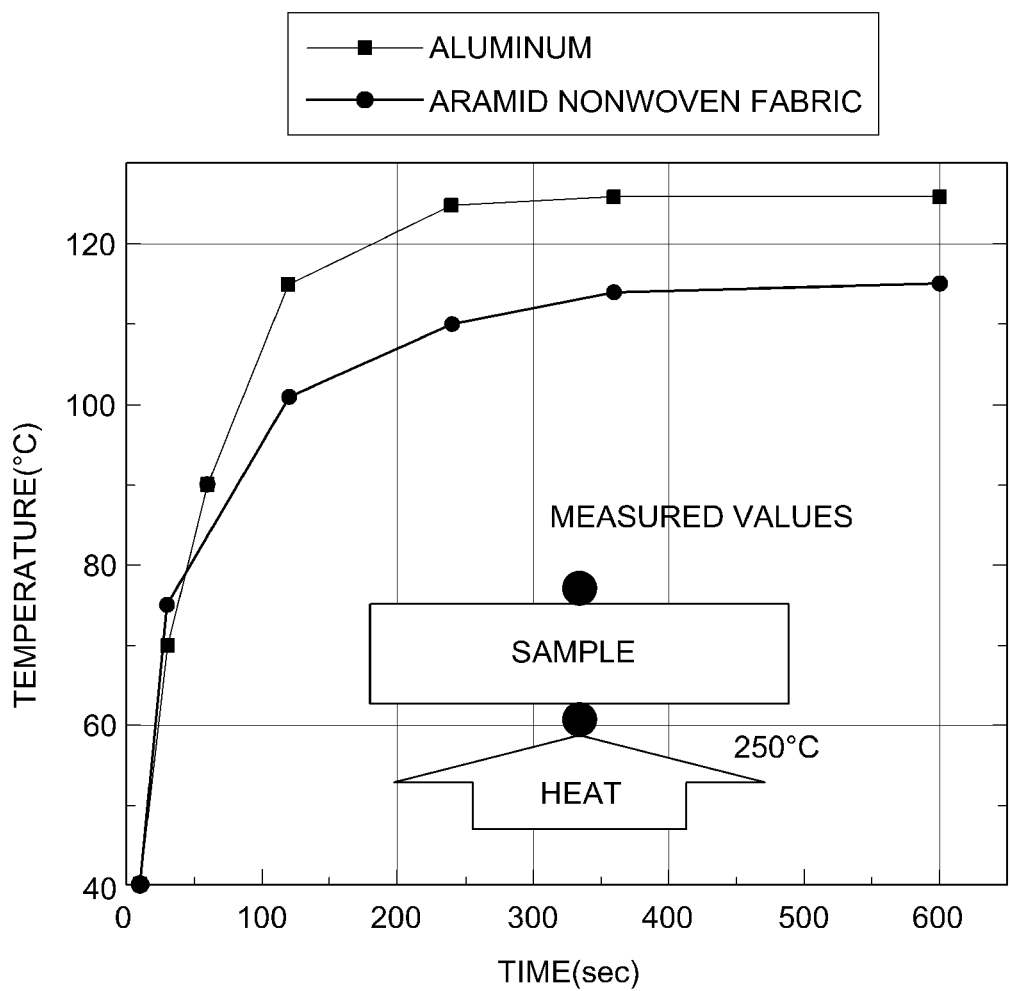
FIG. 5 is a graph illustrating a comparison result of heat-blocking performance of a noise-absorbent fabric for a vehicle according to an embodiment of the present invention.

FIG. 4 is a graph illustrating an evaluation result of sound-absorbing performance of a noise-absorbent fabric for a vehicle prepared by the Example according to an embodiment of the present invention. FIG. 5 is a graph illustrating a comparison result of heat-blocking performance of a noise-absorbent fabric for a vehicle prepared by the Example according to an embodiment of the present invention.

As shown in FIG. 4, a sound-absorbing effect was achieved by installing the aramid nonwoven fabric at an exhaust system.

Also, as shown in FIG. 5, the heat-blocking performance of aluminum demonstrates a temperature reduction from about 250° C. to about 120° C., and the aramid nonwoven fabric demonstrate a temperature reduction from about 250° C. to about 115° C.

Accordingly, it was demonstrated that the aramid nonwoven fabric of the present invention is superior to aluminum (metal) in the heat-blocking performance.

After the nonwoven fabric was cured in a three-dimensional shape through the binder treatment, and used to cover the engine and the exhaust system, interior noise was measured. The results are shown in Table 1.

TABLE 1

|  | IDEL | | D2-mode Acceleration | | N-mode IDEL Noise outside Vehicle | | | |
|---|---|---|---|---|---|---|---|---|
|  | | | | | ENG | ENG | ENG | ENG |
|  | FRT | RR | FRT | RR | TOP | LH | RH | FRT |
| Initial | 80.6 | 79.2 | 100.5 | 98.9 | 49.2 | 52.5 | 53.8 | 54.7 |
| Final | 77.6 | 77.4 | 97.3 | 95.4 | 45.8 | 49.1 | 52.3 | 51.3 |
| Improved | −3 dB | −1.8 dB | −3.2 dB | −3.5 dB | −3.4 dB | −3.4 dB | −1.5 dB | −3.4 dB |

As shown in Table 1, the interior noise before (initial) and after (final) blocking of the engine noise using the noise-absorbent fabric according to the embodiment of the present invention was reduced to a maximum of about 3.4 dB (wherein all units in Table 1 are in dB, decibel).

A noise-absorbent fabric for a vehicle and a method for manufacturing the noise-absorbent fabric according to an embodiment of the present invention have the following advantages.

First, a nonwoven fabric is formed of a super fiber (such as an aramid fiber) with excellent thermal resistance, and then hot components such as engine and exhaust system are covered by the super fiber nonwoven fabric to absorb vibration and noise of the engine and the exhaust system and secure the sound-absorbing performance even when exposed to heightened temperatures.

Second, a super fiber nonwoven fabric can be impregnated in thermosetting resin for a binder treatment to implement a three-dimensional shape of the nonwoven fabric. Thus, the nonwoven fabric can be used for various components of a vehicle with any desired shape.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A noise-absorbent fabric for a vehicle, comprising:
   a mono-layered nonwoven fabric formed of a super fiber with a fineness of about 1 denier to about 15 deniers and a thickness of about 3 mm to about 20 mm; and
   a binder located in a same layer as the nonwoven fabric to maintain a three-dimensional shape of the nonwoven fabric,
   wherein the binder is formed from a thermosetting resin solution comprising a thermosetting resin of about 10 wt % to about 60 wt %, a curing agent of about 2 wt % to about 10 wt %, a catalyst, a flame retardant and a solvent.

2. The noise-absorbent fabric of claim 1, wherein the super fiber is selected from aramid, polybeszoxazole (PBO), polybenzimidazole (PBI), polyimide (PI), and carbon fiber.

3. The noise-absorbent fabric of claim 1, wherein the super fiber is an aramid fiber.

4. The noise-absorbent fabric of claim 1, wherein the nonwoven fabric has a density of about 200 $g/m^2$ to about 1,200 $g/m^2$.

5. The noise-absorbent fabric of claim 1, wherein the thermosetting resin solution comprises an epoxy resin of about 10 wt % to about 60 wt % as of the thermosetting resin, the catalyst of about 1 wt % to about 5 wt %, the flame retardant of about 10 wt % to about 40 wt %, and the residual solvent.

6. The noise-absorbent fabric of claim 5, wherein the epoxy resin is selected from the group consisting of bisphenol A diglycidyl ether, bisphenol F diglycidyl ether, polyoxyproplyene diglycidyl ether, and bisphenol A diglycidyl ether polymer, and combinations thereof.

7. A method for manufacturing a noise-absorbent fabric for a vehicle, comprising:
   forming a nonwoven fabric by a needle punching process using a super fiber with a fineness of about 1 denier to about 15 deniers and a thickness of about 3 mm to about 20 mm;
   impregnating the nonwoven fabric in a thermosetting resin solution;
   drying the impregnated nonwoven fabric; and curing the dried nonwoven fabric at a temperature of at least 200° C.,
   wherein the thermosetting resin solution comprises a thermosetting resin of about 10 wt % to about 60 wt %, a curing agent of about 2 wt % to about 10 wt %, a catalyst, a flame retardant and a solvent.

8. The method of claim 7, wherein the super fiber is selected from aramid, polybeszoxazole (PBO), polybenzimidazole (PBI), polyimide (PI), and carbon fiber.

9. The method of claim 7, wherein the super fiber is an aramid fiber.

10. The method of claim 7, wherein the nonwoven fabric is formed by continuously performing up-down needling, down-up needling, and up-down needling.

11. The method of claim 7, wherein in the needle punching process, the aramid nonwoven fabric is formed by needle strokes of about 30 time/cm² to about 350 time/cm².

12. The method of claim 7, wherein the thermosetting resin solution comprises an epoxy resin of about 10 wt % to about 60 wt % as of the thermosetting resin, the catalyst of about 1 wt % to about 5 wt %, the flame retardant of about 10 wt % to about 40 wt %, and the residual solvent.

13. The method of claim 12, wherein the epoxy resin is selected from the group consisting of bisphenol A diglycidyl ether, bisphenol F diglycidyl ether, polyoxyproplyene diglycidyl ether, and bisphenol A diglycidyl ether polymer, and combinations thereof.

14. A fabric, comprising:
a mono-layered nonwoven fabric formed of a super fiber with a fineness of about 1 denier to about 15 deniers and a thickness of about 3 mm to about 20 mm; and
a binder located in a same layer as the nonwoven fabric to maintain a three-dimensional shape of the nonwoven fabric,
wherein the binder is formed from a thermosetting resin solution comprising an epoxy resin of about 10 wt % to about 60 wt %, a curing agent of about 2 wt % to about 10 wt %, a catalyst of about 1 wt % to about 5 wt %, a flame retardant of about 10 wt % to about 40 wt %, and a residual solvent.

15. The fabric of claim 14 wherein the super fiber is selected from aramid, polybeszoxazole (PBO), polybenzimidazole (PBI), polyimide (PI), and carbon fiber.

16. The fabric of claim 14 wherein the super fiber is an aramid fiber.

17. The fabric of claim 14 wherein the epoxy resin is selected from the group consisting of bisphenol A diglycidyl ether, bisphenol F diglycidyl ether, polyoxyproplyene diglycidyl ether, and bisphenol A diglycidyl ether polymer, and combinations thereof.

18. The fabric of claim 17 wherein the super fiber is selected from aramid, polybeszoxazole (PBO), polybenzimidazole (PBI), polyimide (PI), and carbon fiber.

19. The fabric of claim 17 wherein the super fiber is an aramid fiber.

20. A method for manufacturing a noise-absorbent fabric for a vehicle, comprising:
forming a nonwoven fabric by a needle punching process using a super fiber with a fineness of about 1 denier to about 15 deniers and a thickness of about 3 mm to about 20 mm;
impregnating the nonwoven fabric in a thermosetting resin solution;
drying the impregnated nonwoven fabric; and
curing the dried nonwoven fabric at a temperature of at least 200° C.,
wherein the thermosetting resin solution comprising an epoxy resin of about 10 wt % to about 60 wt %, a curing agent of about 2 wt % to about 10 wt %, a catalyst of about 1 wt % to about 5 wt %, a flame retardant of about 10 wt % to about 40 wt %, and a residual solvent.

21. The method of claim 20 wherein the super fiber is selected from aramid, polybeszoxazole (PBO), polybenzimidazole (PBI), polyimide (PI), and carbon fiber.

22. The method of claim 20 wherein the super fiber is an aramid fiber.

23. The method of claim 20 wherein the epoxy resin is selected from the group consisting of bisphenol A diglycidyl ether, bisphenol F diglycidyl ether, polyoxyproplyene diglycidyl ether, and bisphenol A diglycidyl ether polymer, and combinations thereof.

24. The method of claim 23 wherein the super fiber is selected from aramid, polybeszoxazole (PBO), polybenzimidazole (PBI), polyimide (PI), and carbon fiber.

25. The method of claim 23 wherein the super fiber is an aramid fiber.

* * * * *